No. 653,167. Patented July 3, 1900.
C. J. COLEMAN.
MOTOR VEHICLE.
(Application filed Aug. 11, 1899.)
(No Model.)
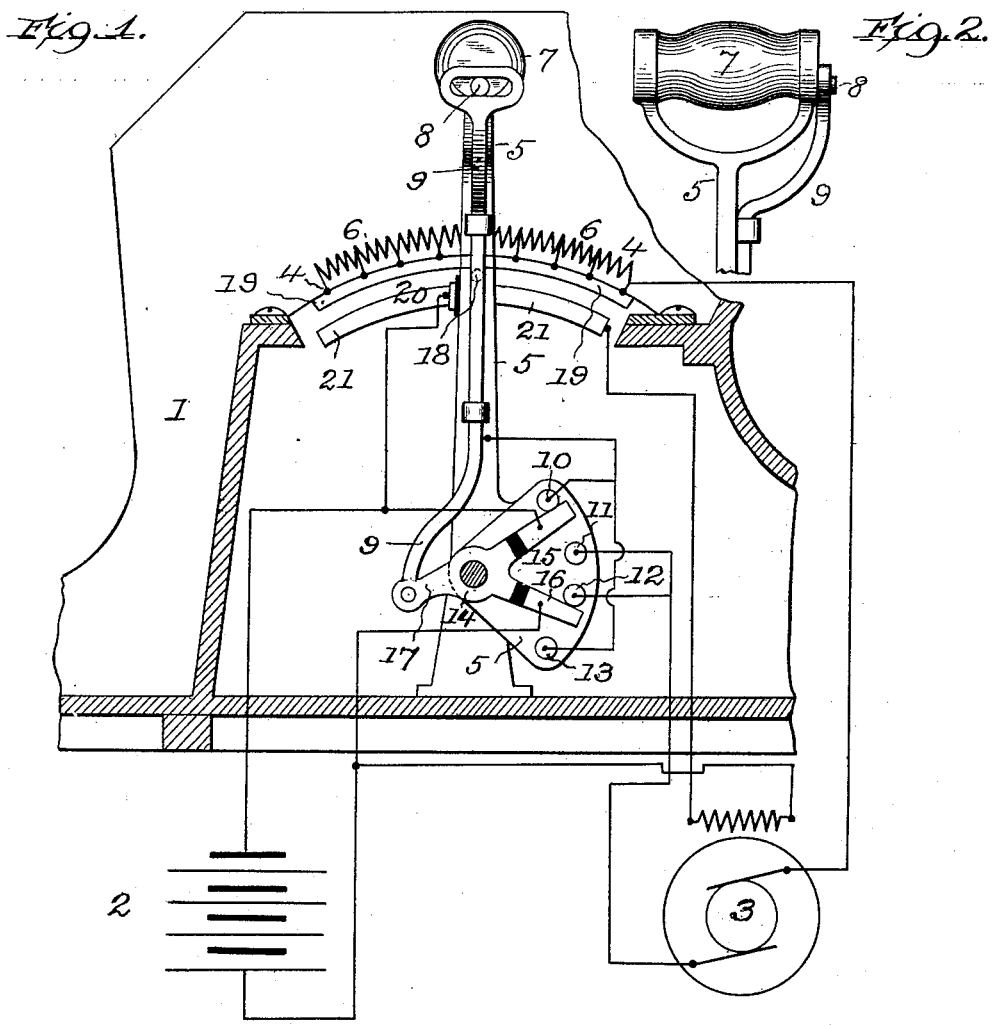
Attest:
Harry B. White.
K. White.
Inventor:
Clyde J. Coleman,
By Robert Burns Attorney.
THE NORRIS PETERS CO., PHOTO-LITHO., WASHINGTON, D. C.

UNITED STATES PATENT OFFICE.

CLYDE J. COLEMAN, OF CHICAGO, ILLINOIS, ASSIGNOR TO THOMAS J. RYAN, OF NEW YORK, N. Y.

MOTOR-VEHICLE.

SPECIFICATION forming part of Letters Patent No. 653,167, dated July 3, 1900.

Application filed August 11, 1899. Serial No. 726,930. (No model.)

*To all whom it may concern:*

Be it known that I, CLYDE J. COLEMAN, a citizen of the United States, residing at Chicago, in the county of Cook and State of Illinois, have invented certain new and useful Improvements in Motor-Vehicles; and I do declare the following to be a full, clear, and exact description of the same, reference being had to the accompanying drawings, forming a part of this specification.

The present invention relates to electrically-propelled vehicles, and more especially to the manually-actuated controlling means by which the operation of the driving electric motor is controlled and regulated.

The object of the present improvement is in the main to provide simple, convenient, and effective manually-actuated combined current controlling and reversing mechanisms for the electric motor of the vehicle and in which a single operating-handle common to both mechanisms is adapted to independently operate the same in such a manner that the current-reversing mechanism is locked against movement until such time as the current-controlling mechanism is in a position to break or open the motor-circuit, all as will hereinafter more fully appear, and be more particularly pointed out in the claims.

In the accompanying drawings, illustrative of the present invention, Figure 1 is a fragmentary longitudinal section of the seat portion of a motor-vehicle, illustrating the general arrangement of the present invention, and diagrammatically the arrangement of the operating electrical circuits, motor, &c.; Fig. 2, a detail front view of the handle portion of the movable member of the combined current controlling and reversing mechanisms of the present invention.

Similar numerals of reference indicate like parts in both views.

Referring to the drawings, 1 represents the seat portion of a motor-vehicle of any usual type and construction, 2 the storage battery or other source of electric power, and 3 the electric motor by which the vehicle is impelled.

4 is the stationary member of the current-controller, formed with a series of insulated contact-sections, as usual, and 5 the movable member of the current-controller of any well-known type, preferably a pivoted arm or hand-lever, as illustrated in Fig. 1.

6 is a rheostat or variable resistance, the coils of which are connected in series with the insulated sections or contact-pieces of the stationary member 4 of the current-controller, and adapted in the shifting of the movable member 5 of such controller to introduce a variable resistance into the motive circuit or to wholly break the same, as usual in such type of electrical appliances. In cases where an arrangement of the batteries is depended upon to afford a variable electromotive force and current to the motor such batteries will be connected to said current-controller in the usual well-known manner, so as to be capable of being used in series or in series multiple at the will of the operator, and accordingly the term "current-controller" in the present description is intended to cover a means for controlling in a variable manner the electromotive force of the electrical circuit of the vehicle-motor, regardless of the particular arrangement and connection of such circuit and regardless of the fact that the circuit to the field or to the armature is the circuit which is reversed in effecting a reversal of the motor with the present invention.

The present invention involves, broadly, the combination of a current-controller, as above described, a current-reversing switch, and operative connections for said switch carried by the movable member of the current-controller, so as to be at all times in position for ready actuation by the hand of the operator engaged in manipulating the current-controller. In the practical carrying out of this part of the present invention an auxiliary means capable of independent actuation is attached to the operating-handle of the movable member 5 of the current-controller and having an operative link or other equivalent connection with the current-reversing switch. In the particular construction shown in Figs. 1 and 2 of the drawings as illustrative of this part of the present invention the grip portion 7 of the operating-handle of the movable member 5 is made capable of a semirotary motion on its pivot-axis in such handle portion and provided with a crank-pin 8, engaging in the slotted yoke end of the link connection 9 of the current-reversing switch to impart positive motion in both directions to said link. Any other equivalent mechanism for attaining such movement of the operating-link connection 9 may, however, be employed without departing from the spirit of this part of the present invention.

The current-reversing-switch mechanism may comprise any usual type of reversing mechanism known to the electrical art. Such switch will preferably comprise opposed pairs of insulated contacts 10 11 and 12 13, arranged concentric with the axis of the operating-handle 5 of the current-controller and moving in unison with said handle as the position of the latter is changed, and an oscillating member 14, pivoted on a common axis with that of the handle 5 and adapted to have movement independent of said handle. Such movable member is provided with a pair of insulated contact-pieces 15 and 16, adapted to alternately contact with the opposed pairs of insulated contacts 10 11 and 12 13, and an operating-arm 17, having operative connection with the operating-link connection 9, heretofore described.

Another part of the present invention involves means whereby the motive circuit must be first broken by a movement of the current-controller handle to its starting position before a movement of the current-reversing switch can be effected to attain a reversal of the motor, the purpose being to prevent any liability of a burning of the motor-windings due to a reversal of the current while it is exerting a maximum or active effect on such windings. In the construction shown in the accompanying drawings for effecting the above result 18 is a laterally-projecting pin on the link connection 9, adapted to engage either the upper or lower surface of the sector-shaped confining-bar 19 to hold the current-reversing-switch mechanism in either of its positions in a positive manner, the construction being such that the locking-pin 18 can only be shifted from the top to the bottom surface of the sector-bar 19, and vice versa, when the operating-handle 5 of the current-controller is in an open or starting position.

20 is an insulated contact-piece carried by the operating lever or handle 5 of the current-controller and connected with one pole of the battery.

21 is a fixed segmental contact-plate connected through the field of the motor with the other pole of the battery. Said contact-plates and the contact-piece 20 are adapted to maintain the current upon the field of the motor at all times, except when the current-controller has broken the circuit to the armature of the motor, when the circuit to the field will also be broken.

Having thus fully described my said invention, what I claim as new, and desire to secure by Letters Patent, is—

1. In a system of electrical propulsion for motor-vehicles, the combination of a circuit-controller, a current-reversing switch, means capable of independent actuation carried by the movable member of the current-controller and having operative connection with said switch, and a single grip for operating the circuit-controller and the reversing-switch, substantially as set forth.

2. In a system of electrical propulsion for motor-vehicles, the combination of a circuit-controller, a current-reversing switch, means capable of independent actuation carried by the movable member of the current-controller and having operative connection with said switch, a single grip for operating the circuit-controller and the reversing-switch and means for locking said switch against movement except when the controller mechanism is in its starting position, substantially as set forth.

3. In a system of electrical propulsion for motor-vehicles, the combination of a circuit-controller, a current-reversing switch, means capable of independent actuation carried by the movable member of the current-controller, the same comprising a semirotary grip having operative connection with the movable member of the reversing-switch, and a single grip for operating the circuit-controller and the reversing-switch, substantially as set forth.

4. In a system of electrical propulsion for motor-vehicles, the combination of a circuit-controller, a current-reversing switch, means capable of independent actuation carried by the movable member of the current-controller and having operative connection with said switch, a single grip for operating the circuit-controller and the reversing-switch and means for locking said switch against movement except when the controller mechanism is in its starting position, the same comprising a laterally-projecting pin on the switch-operating connection, and a confining-bar adapted to be engaged by said lateral pin to prevent a shifting of the switch except when the pin is moved out of engagement with said bar, substantially as set forth.

5. In a system of electrical propulsion for motor-vehicles, the combination of a circuit-controller, a current-reversing switch comprising a fixed and movable member arranged concentric to the pivot-axis of the circuit-controller, means capable of independent actuation carried by the movable member of the current-controller and having operative connection with the movable member of said switch, and a single grip for operating the circuit-controller and the reversing-switch, substantially as set forth.

6. In a system of electrical propulsion for motor-vehicles, the combination of a circuit-controller, a current-reversing switch comprising a fixed and movable member arranged concentric to the pivot-axis of the circuit-controller, means capable of independent actuation carried by the movable member of the current-controller and having operative connection with the movable member of said switch, a single grip for operating the circuit-controller and the reversing-switch and means for locking said switch against movement except when the controller mechanism is in its starting position, substantially as set forth.

7. In a system of electrical propulsion for motor-vehicles, the combination of a circuit-controller, a current-reversing switch comprising a fixed and movable member arranged concentric to the pivot-axis of the circuit-controller, means capable of independent actuation carried by the movable member of the current-controller and having operative connection with the movable member of said switch, a single grip for operating the circuit-controller and the reversing-switch and means for locking said switch against movement except when the controller mechanism is in its starting position, the same comprising a laterally-projecting pin on the switch-operating connection, and a confining-bar adapted to be engaged by said lateral pin to prevent a shifting of the switch except when the pin is moved out of engagement with said bar, substantially as set forth.

In testimony whereof witness my hand this 8th day of August, 1899.

CLYDE J. COLEMAN.

In presence of—
ROBERT BURNS,
JAMES LAVALLIN.